(12) United States Patent
Kim et al.

(10) Patent No.: US 12,511,803 B2
(45) Date of Patent: Dec. 30, 2025

(54) APPARATUS FOR APPLYING GRAPHIC EFFECT AND METHOD THEREFOR

(71) Applicant: SAMSUNG ELECTRONICS CO., LTD., Suwon-si (KR)

(72) Inventors: Woohyun Kim, Suwon-si (KR); Sinjae Lee, Suwon-si (KR); Sangheon Kim, Suwon-si (KR); Wujong Kwon, Suwon-si (KR); Chansu Ahn, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 339 days.

(21) Appl. No.: 18/087,240

(22) Filed: Dec. 22, 2022

(65) Prior Publication Data

US 2023/0129264 A1    Apr. 27, 2023

Related U.S. Application Data

(63) Continuation of application No. PCT/KR2021/008614, filed on Jul. 7, 2021.

(30) Foreign Application Priority Data

Jul. 7, 2020 (KR) .................. 10-2020-0083446

(51) Int. Cl.
G06T 11/60    (2006.01)
G06T 7/90     (2017.01)

(52) U.S. Cl.
CPC .............. G06T 11/60 (2013.01); G06T 7/90 (2017.01)

(58) Field of Classification Search
None
See application file for complete search history.

(56) References Cited

U.S. PATENT DOCUMENTS

| | | |
|---|---|---|
| 7,257,273 B2 | 8/2007 | Li et al. |
| 7,519,231 B2 | 4/2009 | Li et al. |
| 7,783,126 B2 | 8/2010 | Yamashita et al. |
| 7,966,577 B2 | 6/2011 | Chaudhri et al. |
| 9,215,381 B2 | 12/2015 | Yang et al. |
| 9,389,756 B2 | 7/2016 | Chaudhri et al. |
| 9,418,400 B2 | 8/2016 | Sakharnykh et al. |
| 9,569,854 B2 | 2/2017 | Wu et al. |
| 9,607,430 B2 | 3/2017 | Sasayama et al. |
| 9,952,756 B2 | 4/2018 | Conn et al. |
| 10,338,781 B2 | 7/2019 | Chaudhri et al. |
| 10,423,223 B2 | 9/2019 | Cho |

(Continued)

FOREIGN PATENT DOCUMENTS

| | | |
|---|---|---|
| JP | 2006-318389 | 11/2006 |
| JP | 2007-041539 | 2/2007 |

(Continued)

OTHER PUBLICATIONS

Extended European Search Report dated Dec. 8, 2023 issued in European Patent Application No. 21837427.0.

(Continued)

*Primary Examiner* — Lennin R Rodriguezgonzalez
(74) *Attorney, Agent, or Firm* — Nixon & Vanderhye, P.C.

(57) ABSTRACT

An electronic device comprises: a display, a processor operatively connected to the display, and a memory operatively connected to the processor. The memory may include instructions that, when executed, cause the processor to: detect events related to the display of content; apply a gradient graphic effect to at least a partial region of a background image based on a distance from a first region in which the content is displayed; and display, through the display, the background image and the content that has had the gradient graphic effect applied thereto.

17 Claims, 15 Drawing Sheets

(56) References Cited

U.S. PATENT DOCUMENTS

| | | |
|---|---|---|
| 10,692,261 B2 | 6/2020 | Zhang et al. |
| 10,878,609 B2 | 12/2020 | Zhang et al. |
| 10,949,073 B2 | 3/2021 | Conn et al. |
| 10,997,696 B2 | 5/2021 | Zhang |
| 2010/0309216 A1 | 12/2010 | Yamashita et al. |
| 2012/0127198 A1 | 5/2012 | Gundavarapu |
| 2013/0038630 A1 | 2/2013 | Otsuru |
| 2015/0205505 A1 | 7/2015 | Con et al. |
| 2015/0302612 A1 | 10/2015 | Ishikawa et al. |
| 2016/0328853 A1 | 11/2016 | Wu et al. |
| 2016/0364888 A1 | 12/2016 | Jeon et al. |
| 2019/0095086 A1 | 3/2019 | Conn et al. |
| 2020/0319785 A1 | 10/2020 | Conn et al. |
| 2020/0356242 A1 | 11/2020 | Wilson et al. |
| 2021/0117076 A1 | 4/2021 | Conn et al. |
| 2022/0028360 A1 | 1/2022 | Ozdemir |

FOREIGN PATENT DOCUMENTS

| | | |
|---|---|---|
| JP | 2013-016017 | 1/2013 |
| JP | WO13118190 | 5/2015 |
| KR | 10-2013-0139293 | 12/2013 |
| KR | 10-2014-0017420 | 2/2014 |
| KR | 10-2016-0071783 | 2/2016 |
| KR | 10-2016-0144818 | 12/2016 |
| KR | 10-1686926 | 12/2016 |
| KR | 10-2017-0018009 | 2/2017 |
| KR | 10-2017-0131669 | 11/2017 |
| KR | 10-1979560 | 8/2019 |
| KR | 10-2020-0041981 | 4/2020 |
| KR | 10-2021-0090244 | 7/2021 |
| WO | 2014/064864 | 5/2014 |
| WO | 2016/022205 | 2/2016 |

OTHER PUBLICATIONS

GNU, "GNU Image Manipulation Program—User Manual", Jul. 27, 2011, 898 pages.

International Search Report dated Oct. 20, 2021 in PCT/KR2021/008614 (4 pages).

Written Opinion of dated Oct. 20, 2021 in International Patent Application No. PCT/KR2021/008614 (5 pages).

Office Action dated Nov. 20, 2025 in Korean Patent Application No. 10-2020-0083446 and English-language translation.

APPARATUS FOR APPLYING GRAPHIC EFFECT AND METHOD THEREFOR

CROSS-REFERENCE TO RELATED APPLICATIONS

This application is a continuation of International Application No. PCT/KR2021/008614 designating the United States, filed on Jul. 7, 2021, in the Korean Intellectual Property Receiving Office and claiming priority to Korean Patent Application No. 10-2020-0083446, filed on Jul. 7, 2020, in the Korean Intellectual Property Office, the disclosures of which are incorporated by reference herein in their entireties.

BACKGROUND

Field

The disclosure relates to a technology for applying a graphic effect.

Description of Related Art

An electronic device may secure visibility by applying a graphic effect to images displayed via a display. The graphic effect may include at least one of a blur effect, a depth of field (DoF) effect, a dim effect, and a blend effect. For example, when a content such as text is displayed while overlapping a partial region of a region in which a background image is displayed, visibility of the background image decreases when the content is displayed in an opaque form, whereas visibility of the content may decrease when the content is displayed in a transparent form, so that the electronic device may apply the blur effect to the region in which the content is displayed.

Even when a graphic effect is applied to a background image or a content, a boundary section may occur between a region to which the graphic effect is applied and a region to which the graphic effect is not applied, and visibility of the background image or the content in the boundary section may decrease.

In addition, to apply the graphic effect to a partial region of an image, an electronic device must pre-render an entire region of the image and then perform post-rendering processing by mixing a graphic effect-applied image with the original image, so that a performance (e.g., a processing speed) of the electronic device may be reduced.

SUMMARY

An electronic device according to an example embodiment includes: a display, a processor operatively connected to the display, and a memory operatively connected to the processor, and the memory includes instructions that, when executed, cause the processor to: sense an event related to display of a content, apply a gradient graphic effect to at least a partial region of a background image based on a distance from a first region where the content is displayed, and display the gradient graphic effect-applied background image and the content via the display.

A method of an electronic device according to an example embodiment includes: sensing an event related to display of a content, applying a gradient graphic effect to at least a partial region of a background image based on a distance from a first region where the content is displayed, and displaying the gradient graphic effect-applied background image and the content.

According to various example embodiments of the disclosure, the electronic device may provide a natural graphic effect in the boundary section between the regions where the background image and the content are displayed.

According to various example embodiments of the disclosure, when the content is displayed on the background image, the electronic device may guarantee the visibility of the background image and the content and improve a user experience.

According to various example embodiments of the disclosure, the electronic device may secure the visibility of the background image and the content even when the content moves dynamically.

According to various example embodiments of the disclosure, the electronic device may improve the processing speed for the rendering while ensuring the visibility of the background image and the content.

In addition, various effects that are directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Hereinafter, various example embodiments of the disclosure are described with reference to the accompanying drawings. However, it is not intended to limit the disclosure to specific embodiments, and it should be understood that various modifications, equivalents, and/or alternatives of embodiments of the disclosure are included.

Figure 1:
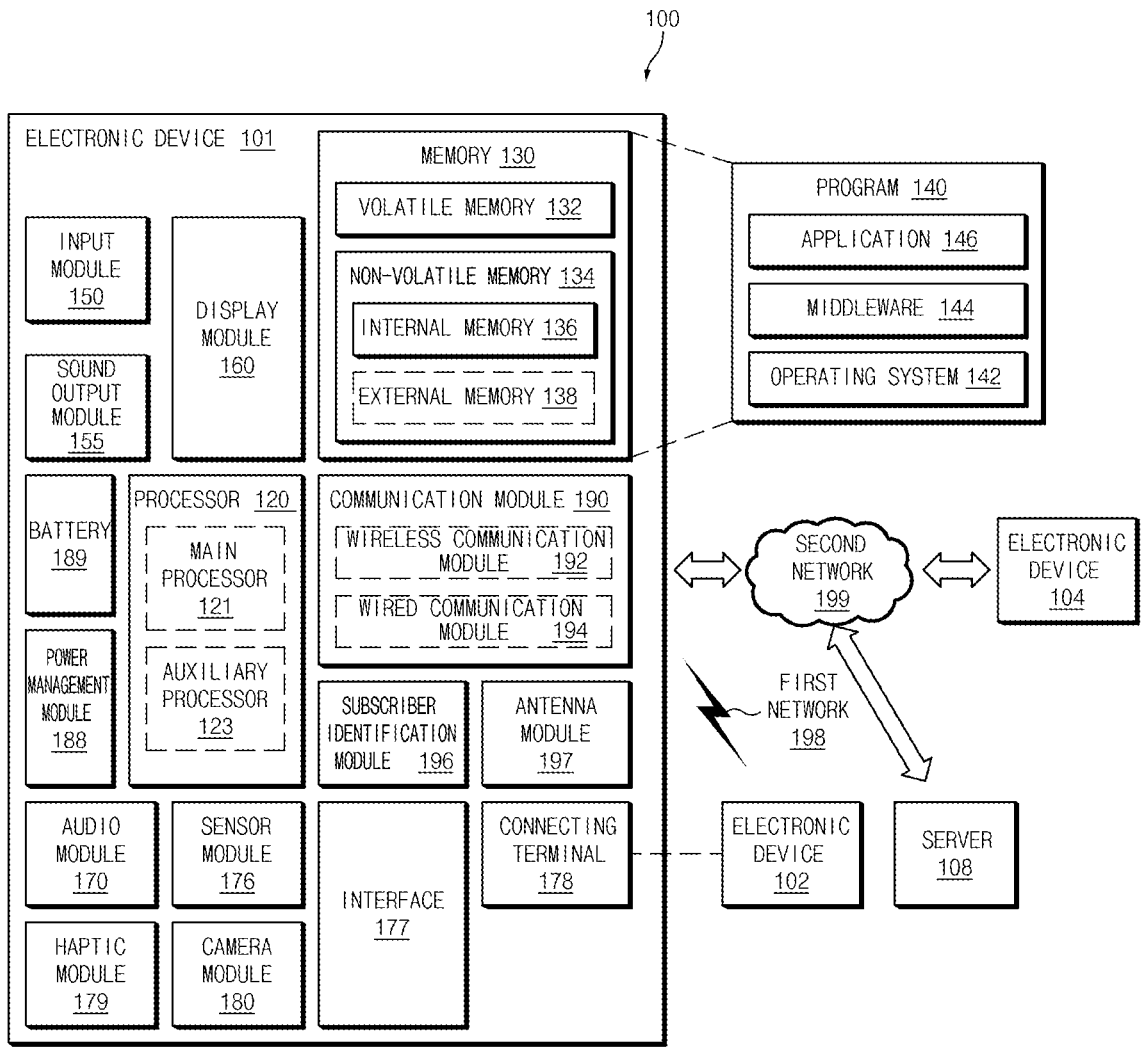
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
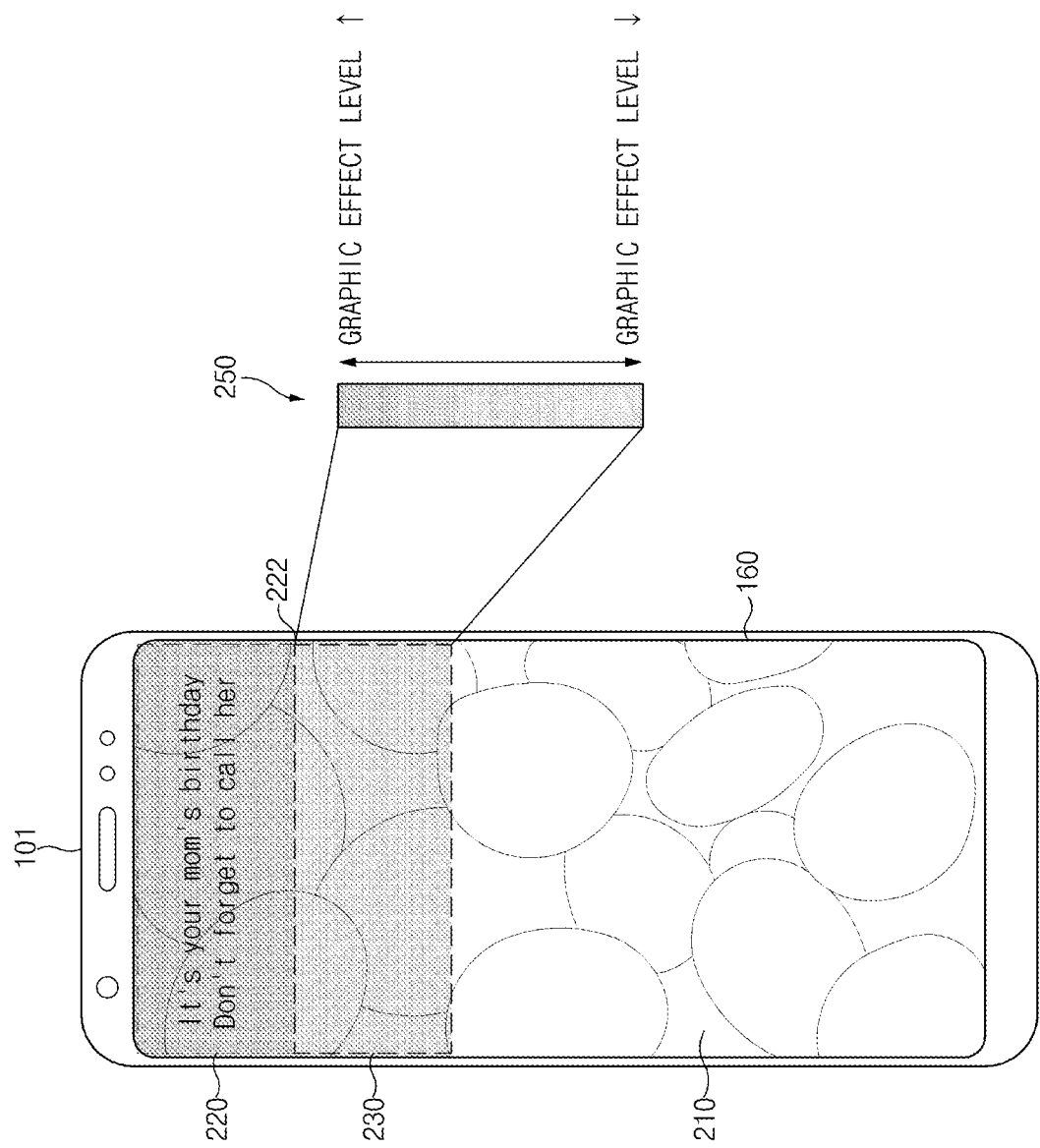
FIG. 2 is a diagram illustrating an example operation of displaying a background image to which a graphic effect is applied according to various embodiments.

FIG. 2 is a diagram illustrating an example operation of displaying a background image 210 to which a graphic effect is applied according to various embodiments. In embodiments to be described below, regions 220 and 230 indicated by dotted lines may refer, for example, to virtual regions that an electronic device (e.g., the electronic device 101 in FIG. 1) internally determines for rendering and display, and are not output via the display module 160.

Referring to FIG. 2, the electronic device 101 may display a content expressed in a form of text (e.g., 'It's your mom's birthday. Don't forget to call her') on a partial region (e.g., 220) of the background image 210 so as to overlap with the background image 210. Although FIG. 2 shows an embodiment of displaying the text, according to various embodiments, the content may include text, an image, a pop-up window, or various types of user interfaces (UIs) that may be displayed by overlapping with the background image 210. A position where the content is displayed on the background image 210 and the number of contents are not limited to the examples shown in FIG. 2.

When the text is displayed on the background image 210 while graphic processing is not performed on the background image 210, because visibility of the text decreases, the electronic device 101 may apply the graphic effect to the region (e.g., 220) where the text is displayed. In the disclosure, the region in which the content, such as text, is displayed on the background image may be referred to as a 'content displaying region'.

The graphic effect may include, for example, at least one of a blur effect, a depth of field (DoF) effect, a dim effect, and a blend effect. Hereinafter, an embodiment to which the blur effect is applied will be mainly described, but the same principle may be equally applied to other graphic effects. In addition, two or more graphic effects (e.g., the blur effect and the dim effect) may be combined with each other.

When the electronic device 101 applies the graphic effect to the content displaying region 220, the region to which the graphic effect is applied and a region to which the graphic effect is not applied are divided from each other around a boundary region 222, so that an unnatural graphic effect may be displayed, and thus, visibility of the background image 210 may decrease. The electronic device 101 according to various embodiments may apply a gradient graphic effect to at least the partial region 230 of the background image 210 in consideration of a distance from the content displaying region 220, thereby securing both the visibility of the background image 210 and visibility of the content displaying region 220, and preventing and/or reducing a decrease in readability caused by the boundary region 222. In addition, because the graphic effect is applied based on the distance from the content displaying region 220, the electronic device 101 may provide a natural graphic effect even when the content dynamically moves (e.g., animation).

For example, referring to a graph 250 indicating a level of the graphic effect applied to at least the partial region 230 of the background image 210, the electronic device 101 may set the graphic effect level higher (e.g., the blur effect is strongly applied) in a direction closer to the content displaying region 220 or the boundary region 222, and may set the graphic effect level lower in a direction farther away from the content displaying region 220 (e.g., the blur effect is weakly applied).

Although FIG. 2 shows the embodiment of applying the gradient graphic effect to a region (e.g., 230) beneath the content displaying region 220, according to other embodiments, the electronic device 101 may apply the gradient graphic effect onto a partial region of the background image 210 including the content displaying region 220. In this case, for example, the electronic device 101 may apply the gradient graphic effect to a partial region of the background image 210 based on a distance from another point (e.g., a center point or an upper side) of the content displaying region.

Figure 3:
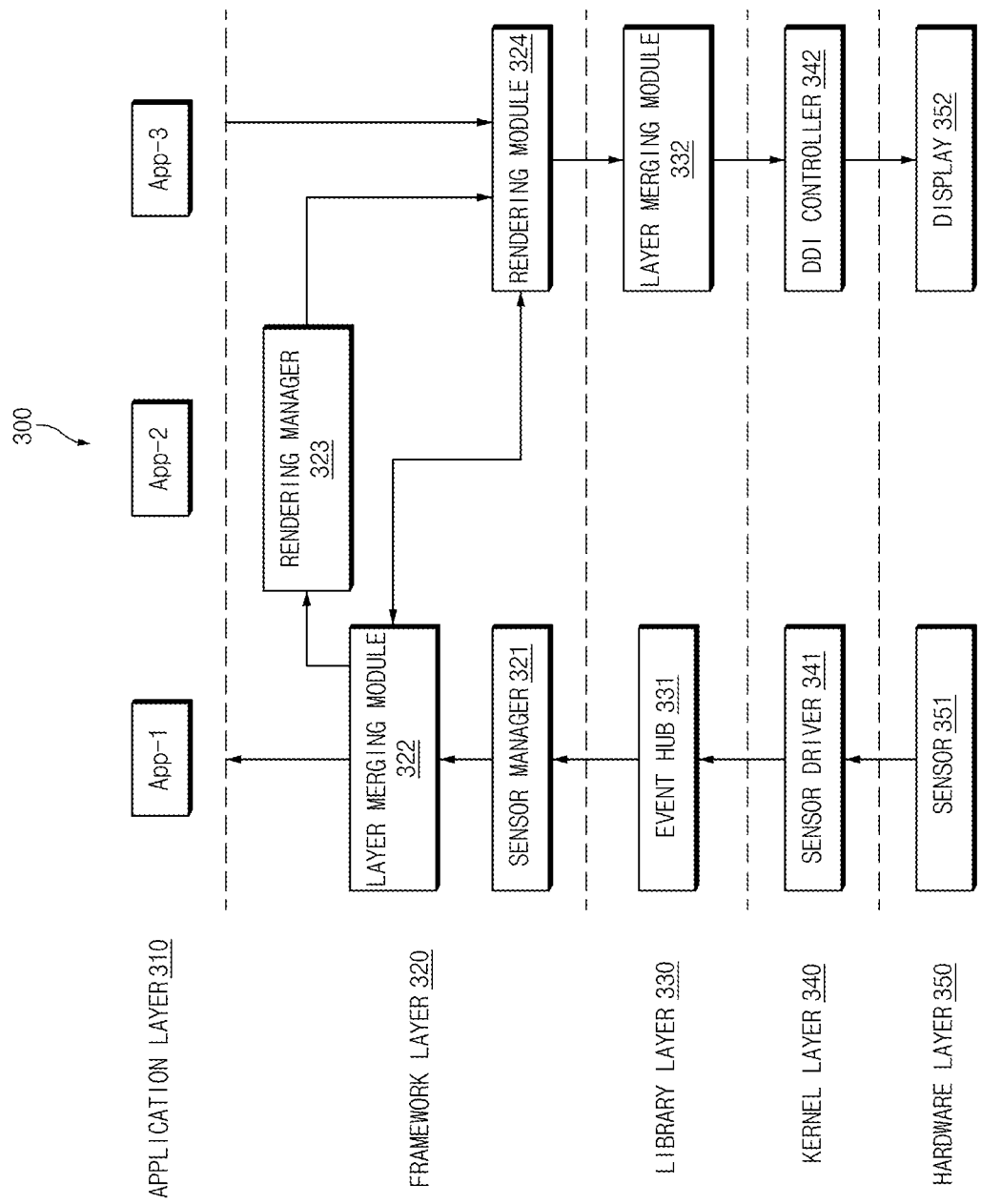
FIG. 3 is a block diagram illustrating an example architectural structure of an electronic device according to various embodiments.

FIG. 3 is a block diagram illustrating an example architectural structure 300 of an electronic device according to various embodiments.

An electronic device (e.g., the electronic device 101 in FIG. 1) according to various embodiments may include an application layer 310, a framework layer 320, a library layer 330, a kernel layer 340, and a hardware layer 350.

Referring to FIG. 3, the application layer 310, the framework layer 320, the library layer 330, and the kernel layer 340 may be software, a set of instructions or a program stored in the memory 130 in FIG. 1. According to embodiments, the framework layer 320 and the library layer 330 may be integrated into one.

The application layer 310 may include at least one application (e.g., the application 146 in FIG. 1) (e.g., App-1, App-2, and App-3). The at least one application may render a content and/or a background image to be displayed on a display 352 via a rendering module 324. The content and the background image may be rendered (or drawn) on different layers.

The framework layer 320 may include a sensor manager 321, a window manager 322, a rendering manager 323, and the rendering module 324. The sensor manager 321 may transmit an event sensed by a sensor 351 to an application related to the sensor 351, included in the application layer 310. The event sensed by the sensor 351 may be, for example, an event related to the display of the content. When the event related to the display of the content is sensed via the sensor 351, the window manager 322 may transmit information on a region (e.g., the content displaying region 220 in FIG. 2) in which the content is displayed to the application layer 310, the rendering manager 323, and/or the rendering module 324. The information on the region in which the content is displayed may be referred to as 'geometry information'. The rendering manager 323 may determine at least one parameter for applying the graphic effect to the background image, and control the rendering module 324 to render the background image in which the gradient graphic effect is applied to at least the partial region thereof.

For example, the rendering manager 323 may determine the at least one parameter for applying the graphic effect to the background image based on the received information (e.g., the geometry information) on the region in which the content is displayed.

The rendering module 324 may render the content and the background image under the control of the application or the rendering manager 323.

The library layer 330 may include a hardware abstraction layer (HAL). The HAL may refer, for example, to an abstracted layer between hardware and software included in the hardware layer 350. An event hub 331 may be an interface module for standardizing the event sensed by the sensor 351 such as a touch module. For example, the event hub 331 may transmit the event related to the display of the content sensed by the sensor 351 to the sensor manager 321. A layer merging module 332 may merge a plurality of layers with each other. For example, the layer merging module 332 may merge the content and the background image to each other. The layer merging module 332 may transmit the merged layers to a display driver integrated circuit (DDI) controller 342.

The kernel layer 340 may include at least one driver for controlling components included in the hardware layer 350. Components included in the kernel layer 340 may be implemented in software or hardware. A sensor driver 341 may be an interface module for controlling the sensor 351. The DDI controller 342 may include a display driving circuit (not shown).

The hardware layer 350 may refer, for example, to a layer including hardware components. The sensor 351 may perform a function similar to that of the sensor module 176 or the input module 150 in FIG. 1. According to an embodiment, the sensor 351 may sense the event related to the display of the content. For example, the electronic device 101 may obtain an input (e.g., a touch input) related to the display of the content via the touch module.

The display 352 may be at least a portion of the display module 160 in FIG. 1. According to an embodiment, the display 352 may display various screens displaying functions of the electronic device 101 under control of a processor (e.g., the processor 120 in FIG. 1). For example, the display 352 may display an execution screen of the application, a home screen, the background image to which the graphic effect is applied, and the content.

According to an embodiment, the rendering manager 323, the rendering module 324, and the layer merging module 332 may be one integrated module (or program). In this case, the integrated module may perform an operation of rendering the content and the background image via a processor for processing graphics, such as a graphic processing unit (GPU).

Figure 4:
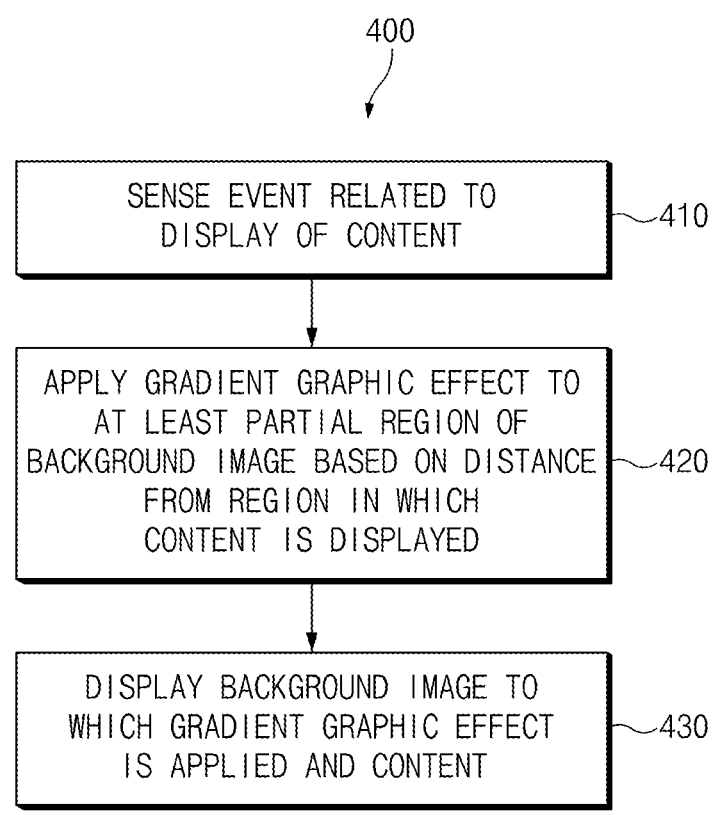
FIG. 4 is a flowchart illustrating example operations of an electronic device for displaying a background image to which a graphic effect is applied according to various embodiments.

FIG. 4 is a flowchart 400 illustrating example operations of the electronic device 101 for displaying the background image to which the graphic effect is applied according to various embodiments. The operations of the flowchart to be described below may be implemented by the electronic device 101 or by the components included in the electronic device 101. For example, the operations of the flowchart to be described below may be performed by a processor (e.g., the processor 120 in FIG. 1). In this case, the processor may perform the operations by executing instructions stored in a memory (e.g., the memory 130 in FIG. 1). The instructions stored in the memory may be implemented by at least one of the components shown in FIG. 3.

Referring to FIG. 4, in operation 410, the electronic device 101 may sense the event related to the display of the content. For example, the event related to the display of the content may include a case in which a text message is received, a case in which a notification event occurs, or a case in which the UI needs to be displayed in response to a user input.

According to an embodiment, before the electronic device 101 senses the event related to the display of the content, the electronic device 101 may output the background image via the display (e.g., the display module 160 in FIG. 1). In other words, the electronic device 101 may sense the event related to the display of the content while the background image is output.

In operation 420, the electronic device 101 may apply the gradient graphic effect to at least the partial region (e.g., 230 in FIG. 2) of the background image (e.g., 210 in FIG. 2) based on the distance from the region (e.g., the content displaying region 220 in FIG. 2) in which the content is displayed. For example, the electronic device 101 may increase a blur level of at least the partial region of the background image in the direction closer to the region in which the content is displayed, and decrease the blur level in the direction farther away from the region in which the content is displayed.

In operation 430, the electronic device 101 may display the background image to which the gradient graphic effect is applied and the content via the display. For example, the background image is displayed more blurry in a region with a high blur level, so that visibility of the content may increase. On the other hand, the background image is displayed more clearly in a region with a low blur level, so that the visibility of the background image may increase. In addition, because a boundary between the content and the background image does not occur via the above-described operation, the readability and aesthetics may be increased.

Figure 5:
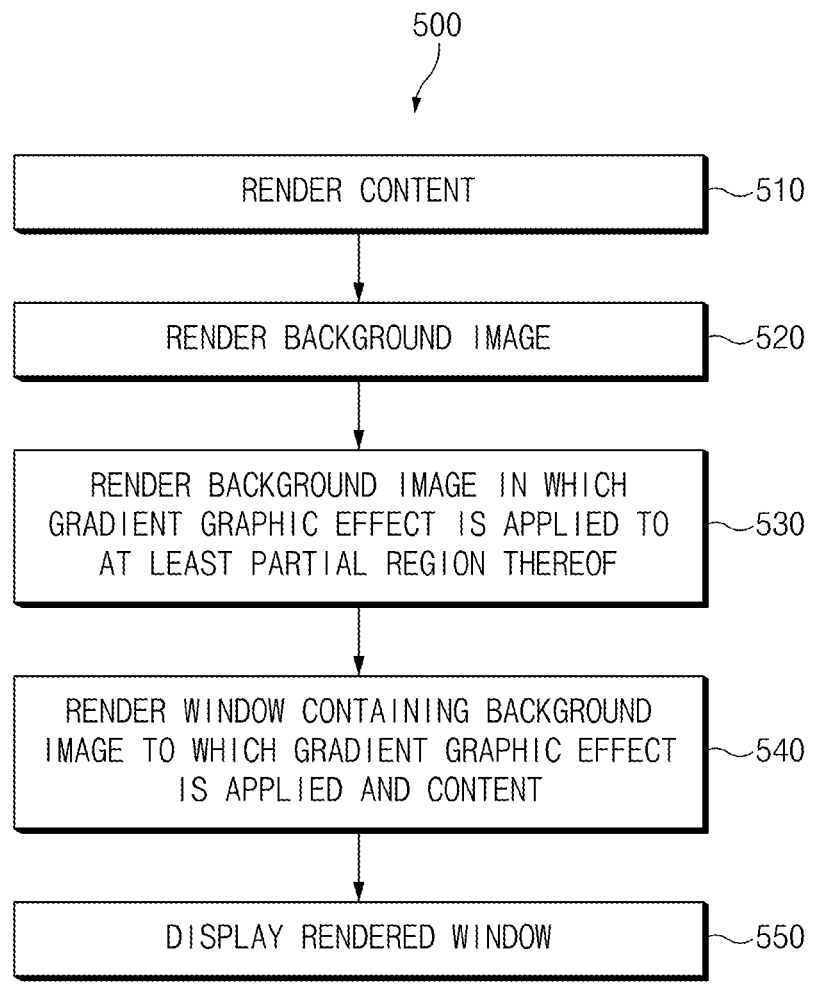
FIG. 5 is a flowchart illustrating example operations of an electronic device for displaying a window containing a content and a background image according to various embodiments.
Figure 6:
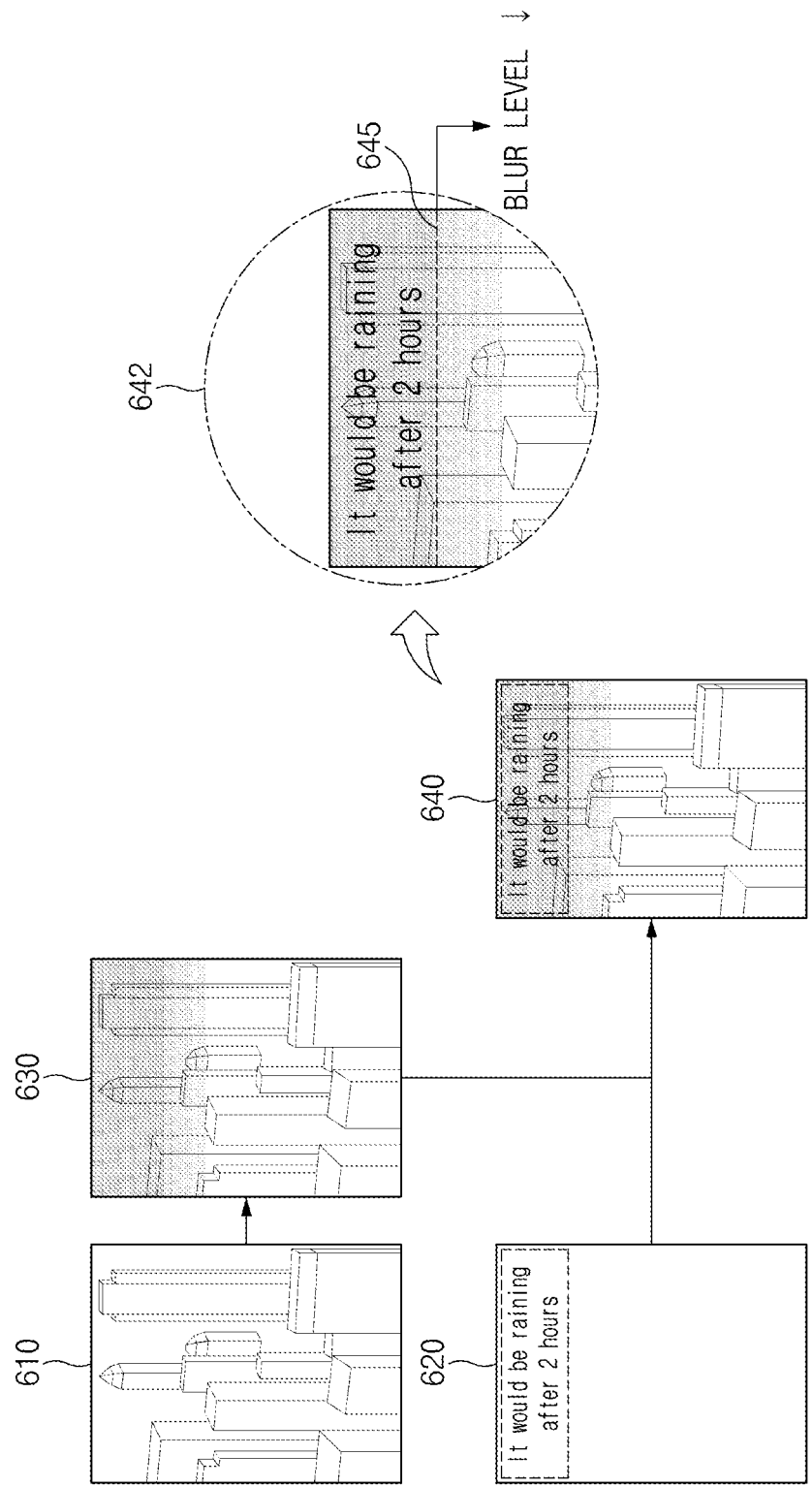
FIG. 6 is a diagram illustrating an example operation of displaying a window containing a content and a background image according to various embodiments.

FIGS. 5 and 6 include a flowchart and diagram illustrating an example operation of displaying a window containing a content and a background image according to various embodiments. In embodiments to be described below, dotted lines (e.g., 620 and 645) may refer, for example, to virtual regions internally determined by the electronic device 101 for displaying the window, and are not output via the display.

FIG. 5 is a flowchart illustrating example operations of the electronic device 101 for displaying a window containing a content and a background image. The operations illustrated in FIG. 5 may be, for example, operations that implement operations 420 and 430 in FIG. 4.

Referring to FIG. 5, in operation 510, the electronic device 101 may render the content. For example, the electronic device 101 may render text (e.g., 'It would be raining after 2 hours') shown in FIG. 6. The electronic device 101 may identify a region in which the text is displayed, that is, a content displaying region 620. For example, the content displaying region 620 of the text shown in FIG. 6 may be an upper end of the display.

In operation 520, the electronic device 101 may render the background image. For example, the electronic device 101 may render a background image 610 shown in FIG. 6. According to an embodiment, operations 510 and 520 may be performed independently of or in parallel with each other, and operation 520 may be performed before operation 510. For example, the electronic device 101 may render the background image first and then render the content.

In operation 530, the electronic device 101 may render the background image in which the gradient graphic effect is applied to at least the partial region thereof. For example, the electronic device 101 may render a background image 630 in which the blur effect is applied to a partial region corresponding to the content displaying region 620 as shown in FIG. 6.

In operation 540, the electronic device 101 may render a window containing the background image to which the gradient graphic effect is applied and the content. In the disclosure, the window may be referred to as a view. For example, the electronic device 101 may render a window 640 shown in FIG. 6. A window 642 illustrates the enlarged content displaying region and the enlarged partial region of the background image in the window 640. According to an embodiment, the electronic device 101 may reduce the blur level in a direction farther away from the content displaying region 620 based on a boundary 645 of the content displaying region 620.

In operation 550, the electronic device 101 may display the rendered window via the display. For example, the electronic device 101 may output the window 640 in FIG. 6 via the display (e.g., the display module 160 in FIG. 1).

Although FIGS. 5 and 6 illustrate an embodiment in which the rendered content and the rendered background image are created in one window, according to various embodiments, the electronic device 101 may independently generate and display a content window and a background image window. In this case, the electronic device 101 may apply an additional effect by adding another window (or layer) in addition to the content window and the background image window.

Figure 7:
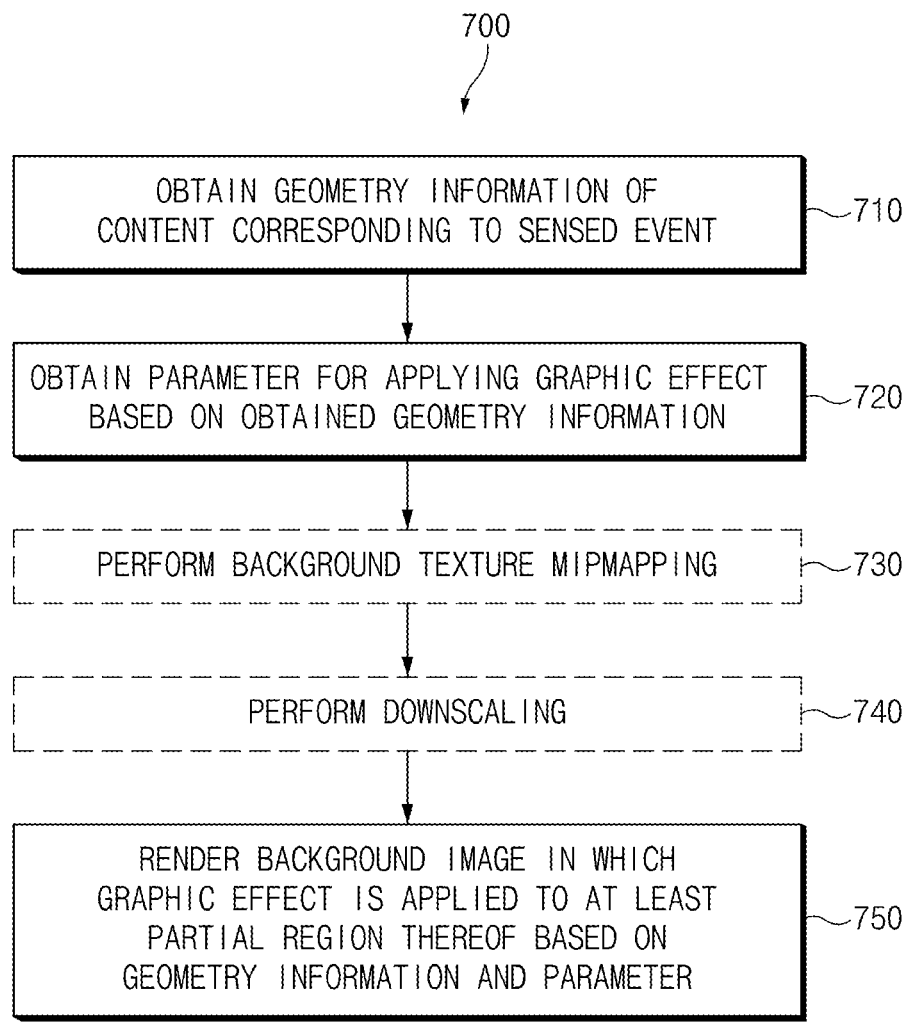
FIG. 7 is a flowchart illustrating example operations of an electronic device for rendering a background image to which a graphic effect is applied according to various embodiments.

FIG. 7 is a flowchart 700 illustrating example operations of the electronic device 101 for rendering the background image to which the graphic effect is applied according to various embodiments. The operations illustrated in FIG. 7 may be, for example, operations that implement operation 420 in FIG. 4 or operation 530 in FIG. 5.

Referring to FIG. 7, in operation 710, the electronic device 101 may obtain geometry information of the content corresponding to the sensed event. The geometry information may include geometric information such as a position, a size, or a rotated state of the region in which the content is displayed. According to an embodiment, the geometry information may be expressed as a texture map or a vector array for coordinates.

In operation 720, the electronic device 101 may obtain the at least one parameter for applying the graphic effect based on the obtained geometry information. The at least one parameter for applying the graphic effect may include, for example, at least one of the graphic effect level, an interpolation type for determining a graphic effect applying pattern (e.g., a pattern of a change from a minimum blur level to a maximum blur level), a graphic effect-applied range, information for additional processing of the animation (e.g., a direction or a time of the animation), a level of detail (LOD) value, and an offset value. The graphic effect level may include, for example, at least one of the blur level, a DoF level, a dim level, and a blend level (e.g., an additional color, a brightness, or a transparency).

According to an embodiment, the electronic device 101 may determine the at least one parameter based on a relationship (e.g., a distance) between the position of the content displaying region obtained via the geometry information and a plurality of pixels of the background image. For example, the electronic device 101 may adjust at least one of the blur level, the LOD value, and the offset value based on the distance from the content displaying region.

In operation 750, the electronic device 101 may render the background image in which the graphic effect is applied to at least the partial region thereof based on the obtained geometry information and the at least one parameter. For example, the electronic device 101 may perform the rendering in a vertical or horizontal direction.

According to an embodiment, the electronic device 101 may additionally perform operation 730. For example, the electronic device 101 may improve a graphics quality of the screen (or the window) displayed on the display by performing background texture mipmapping (or 'mipmapping'). The performing of the mipmapping may refer, for example, to generating a set of images including a basic image and images obtained by continuously reducing the basic image in advance for a purpose of improving a rendering speed. The electronic device 101 may increase a memory storage space and increase a processing speed of the rendering by not performing the mipmapping.

According to an embodiment, the electronic device 101 may not perform operation 740. For example, the lower the minimum blur level, the smaller the magnitude of a buffer for downscaling, so that, when the minimum blur level is 0, the electronic device 101 may not perform the downscaling.

Operations 720, 730, and 740 shown in FIG. 7 may not be performed based on an order shown in FIG. 7, but may be performed in any order. In addition, the order of operations 720, 730, and 740 may not be limited by the graphic effect.

Figure 8:
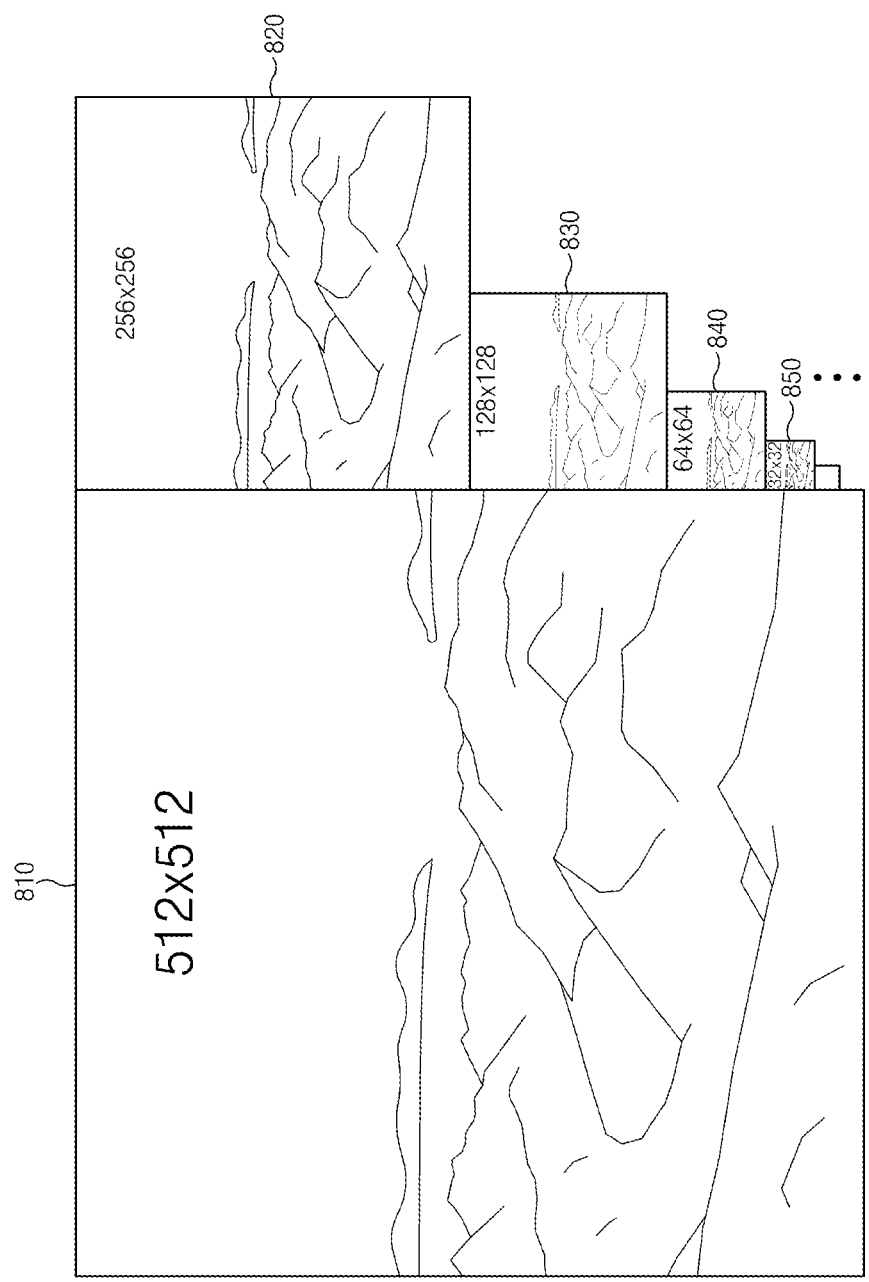
FIG. 8 is a diagram illustrating a plurality of images generated via mipmapping according to various embodiments.
Figure 9:
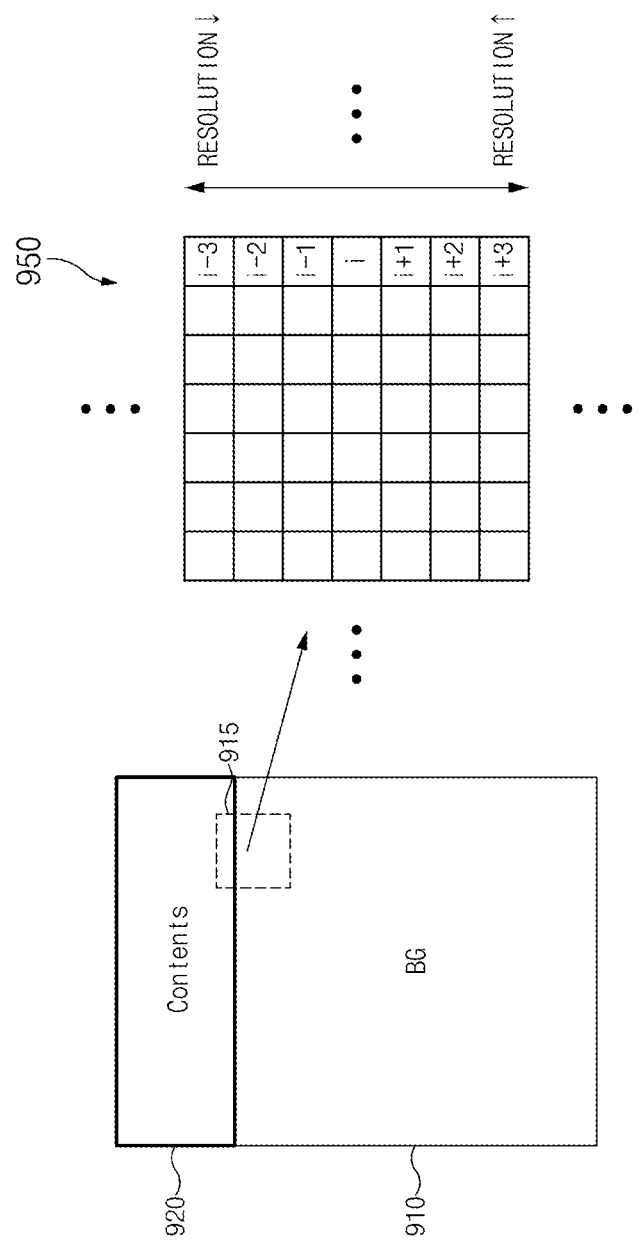
FIG. 9 is a diagram illustrating an example operation of determining level of detail (LOD) values of a plurality of pixels according to various embodiments.
Figure 10:
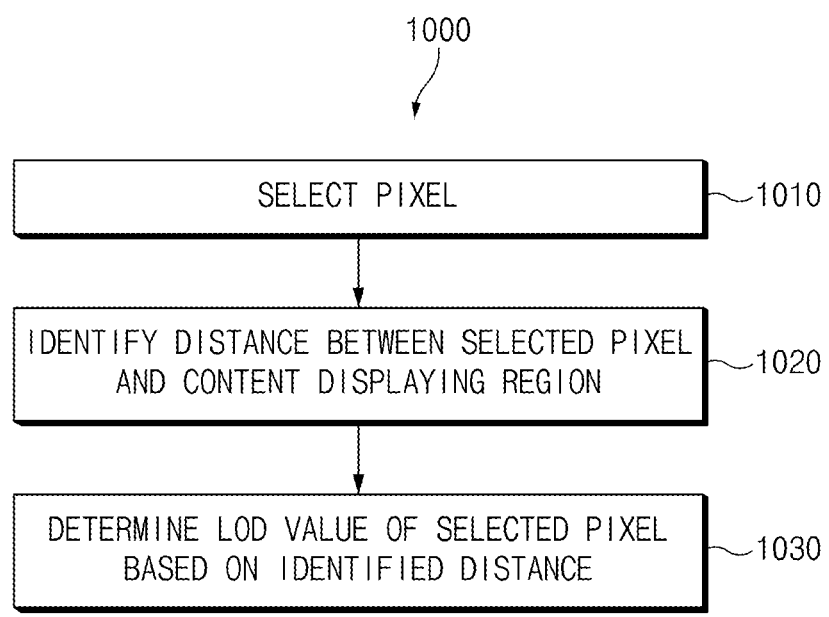
FIG. 10 is a flowchart illustrating example operations of an electronic device for determining LOD values of a plurality of pixels according to various embodiments.

FIGS. 8, 9 and 10 include diagrams and a flowchart illustrating example operation of determining an LOD value according to various embodiments. FIG. 8 is a diagram illustrating a plurality of images generated via mipmapping. FIG. 9 is a diagram illustrating an example operation of determining LOD values of a plurality of pixels according to various embodiments. FIG. 10 is a flowchart 1000 illustrating example operations of the electronic device 101 for determining the LOD values of the plurality of pixels according to various embodiments.

Referring to FIG. 8, before performing the rendering, the electronic device 101 may generate a plurality of images having a plurality of resolutions for the background image via the mipmapping. Because the images generated via the mipmapping are buffers generated internally by the processor such as the GPU, the images may also be referred to as 'image buffers'. For example, the electronic device 101 may generate an image 810 having a resolution of 512×512. The electronic device 101 may generate images (e.g., 820, 830, 840, and 850, . . . ) having resolutions that are multiples of the 512×512 resolution. In addition, the electronic device 101 may generate an image having a resolution of 1×1. Because the LOD value may represent complexity of the pixel, depending on the LOD value, images with different resolutions may be applied to the rendering. For example, when the LOD value is 1, an image of a high resolution (e.g., 512×512) may be applied. When the LOD value is 10, an image of a low resolution (e.g., 1×1) may be applied.

According to various embodiments, the electronic device 101 may apply the blur effect by adjusting LOD values of the plurality of pixels of the background image based on the distance from the content displaying region. Referring to FIG. 9, a content displaying region 920 may overlap a background image 910 and the background image 910 may be rendered. A reference numeral 950 denotes a plurality of pixels of a partial region 915 of the background image 910. The electronic device 101 may set blur levels of the plurality of pixels to increase in a direction closer to the content displaying region 920 and decrease in a direction farther away from the content displaying region 920, thereby applying the gradient blur effect. The higher the blur level, the lower the resolution, so that a higher LOD value may be applied. In addition, the lower the blur level, the higher the resolution, so that a lower LOD value may be applied. For example, when an LOD value of an i-th pixel is 5, an LOD value of an i−1th pixel may be 6, and an LOD value of an i+1-th pixel may be 4. According to an embodiment, the LOD value may be a positive real number rather than a natural number. For example, the electronic device 101 may obtain the LOD value of the real number by performing interpolation on two or more pixels.

Referring to FIG. 10, operations included in the flowchart 1000 may refer, for example, to operations that implement operation 750 in FIG. 7. In operation 1010, the electronic device 101 may select one pixel (e.g., the i-th pixel in FIG. 9) among the plurality of pixels of at least the partial region (e.g., 915 in FIG. 9) of the background image.

In operation 1020, the electronic device 101 may identify a distance between the selected pixel and the content displaying region (e.g., 920 in FIG. 10). According to an embodiment, the electronic device 101 may identify the distance between the content displaying region and the pixel using the geometry information of the content. For example, the electronic device 101 may identify a distance between a boundary line of the content displaying region and the pixel, or a distance between a center of the content displaying region and the pixel.

In operation 1030, the electronic device 101 may determine an LOD value of the selected pixel based on the identified distance. For example, as the distance between the selected pixel and the content displaying region decreases, the electronic device 101 may set the LOD value of the selected pixel to be higher, thereby enhancing the blur effect. As the distance between the selected pixel and the content displaying region increases, the electronic device 101 may set the LOD value of the selected pixel to be lower, thereby reducing the blur effect.

The electronic device 101 may apply the gradient graphic effect to at least the partial region of the background image by performing operations 1010 to 1030 for each of the plurality of pixels.

Figure 11:
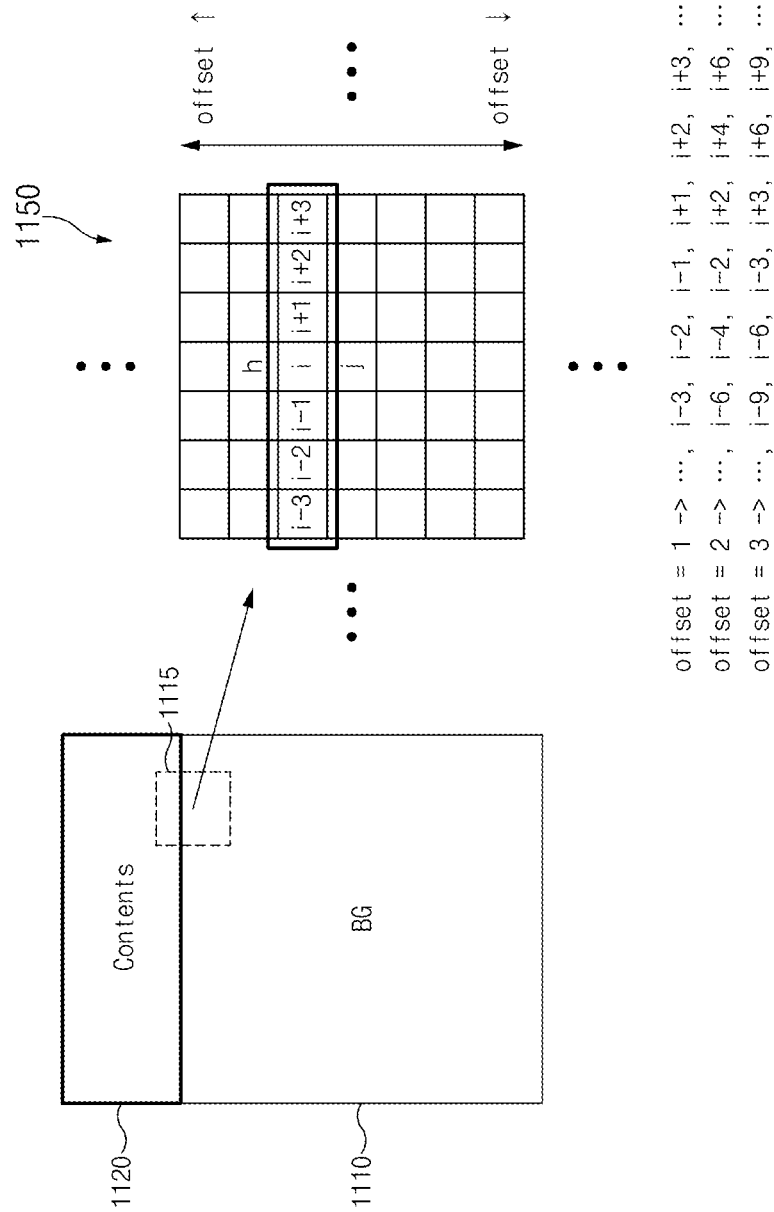
FIG. 11 is a diagram illustrating an example operation of determining offset values of a plurality of pixels according to various embodiments.
Figure 12:
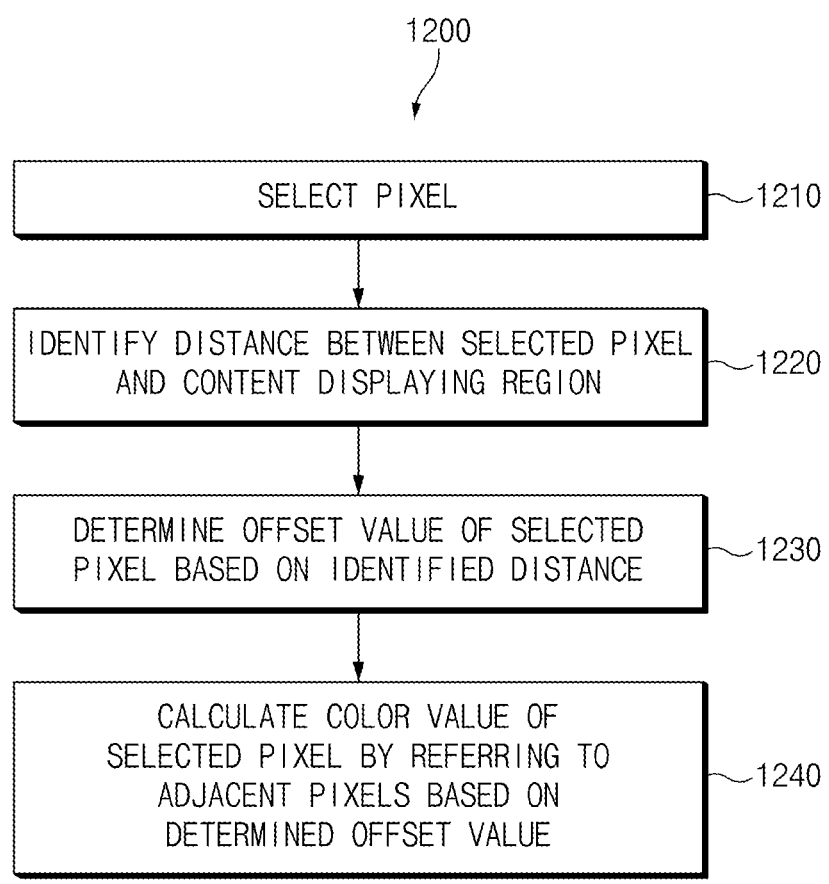
FIG. 12 is a flowchart illustrating example operations of an electronic device for determining offset values of a plurality of pixels according to various embodiments.

FIGS. 11 and 12 include a diagram and flowchart illustrating an example operation of determining an offset value according to various embodiments. FIG. 11 is a diagram illustrating an example operation of determining offset values of a plurality of pixels according to various embodiments. FIG. 12 is a flowchart 1200 illustrating example operations of the electronic device 101 for determining the offset values of the plurality of pixels according to various embodiments. Although FIG. 11 illustrates an embodiment referring to pixels adjacent to each other in the horizontal direction, embodiments referring to pixels adjacent to each other in the vertical direction, in a diagonal direction, in two or more directions, or in a circle may be equally applied.

Referring to FIG. 11, a reference numeral 1150 denotes a plurality of pixels of a partial region 1115 of a background image 1110. To perform the rendering, the electronic device 101 may refer to adjacent pixels when calculating a pixel value (e.g., a color value such as red green blue alpha (RGBA)) for a specific pixel. For example, the electronic device 101 may use distances between an i-th pixel and pixels (e.g., i−1, i−2, i−3, i+1, i+2, or i+3th pixels) adjacent to the i-th pixel in the horizontal direction and color values of the adjacent pixels to calculate a color value of the i-th pixel.

The offset value may be proportional to a spacing between adjacent pixels referred to for calculating a color value of a specific pixel. For example, assuming that the color value of the i-th pixel is calculated, when the offset value is 1, the electronic device 101 may refer to pixels (e.g., the i−1, the i−2, the i−3, the i+1, the i+2, and the i+3th) adjacent to each other by one blank from the i-th pixel. On the other hand, when the offset value is 2, the electronic device 101 may refer to pixels (e.g., the i−2, an i−4, an i−6, the i+2, an i+4, and an i+6th) adjacent to each other by two blanks from the i-th pixel. In the same principle, when the offset value is 3, the electronic device 101 may refer to pixels (e.g., the i−3, the i−6, an i−9, the i+3, the i+6, and an i+9) adjacent to each other by three blanks from the i-th pixel.

As a spacing between the referenced pixels is greater (that is, as the offset value becomes higher), the blur level increases, so that the electronic device 101 may adjust the offset values of the pixels based on distances between the pixels and a content displaying region 1120. For example, when an offset value of the i-th pixel is 3, an offset value of an h-th pixel may be 4, and an offset value of the j-th pixel may be 2. According to an embodiment, the offset value may be the positive real number rather than the natural number. For example, the electronic device 101 may obtain the offset value of the real number by performing the interpolation on the two or more pixels.

Referring to FIG. 12, the operations included in the flowchart 1200 may refer, for example, to operations that implement operation 750 in FIG. 7. In operation 1210, the electronic device 101 may select one pixel (e.g., the i-th pixel in FIG. 11) among a plurality of pixels of at least a partial region (e.g., 1115 in FIG. 11) of the background image.

In operation 1220, the electronic device 101 may identify the distance between the selected pixel and the content displaying region (e.g., 1120 in FIG. 11). According to an embodiment, the electronic device 101 may identify the distance between the content displaying region and the pixel using the geometry information of the content.

In operation 1230, the electronic device 101 may determine an offset value of the selected pixel based on the identified distance. For example, as the distance between the pixel and the content displaying region decreases, the electronic device 101 may set the offset value of the pixel to be higher. As the distance between the pixel and the content displaying region increases, the electronic device 101 may set the offset value of the pixel to be lower.

In operation 1240, the electronic device 101 may calculate a color value of the selected pixel by referring to the adjacent pixels based on the determined offset value.

The electronic device 101 may apply the gradient graphic effect to at least the partial region of the background image by performing operations 1210 to 1240 for each of the plurality of pixels.

Although FIGS. 8, 9, 10, 11 and 12 have described example operations of determining the LOD value and the offset value independently of each other, according to various embodiments, the electronic device 101 may determine the offset value based on the LOD value or may determine the LOD value based on the offset value. Alternatively, the electronic device 101 may determine the LOD value and the offset value substantially simultaneously.

Figure 13:
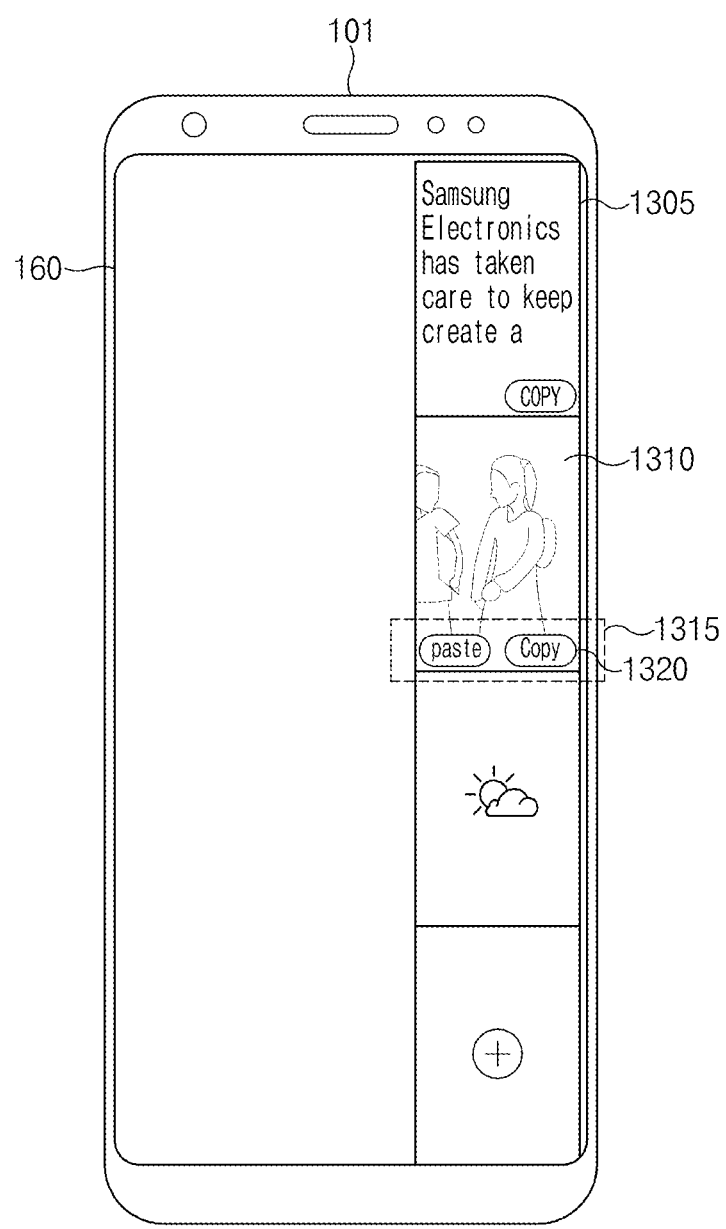
FIG. 13 is a diagram illustrating an example operation of displaying a background image in an edge region according to various embodiments.
Figure 14:
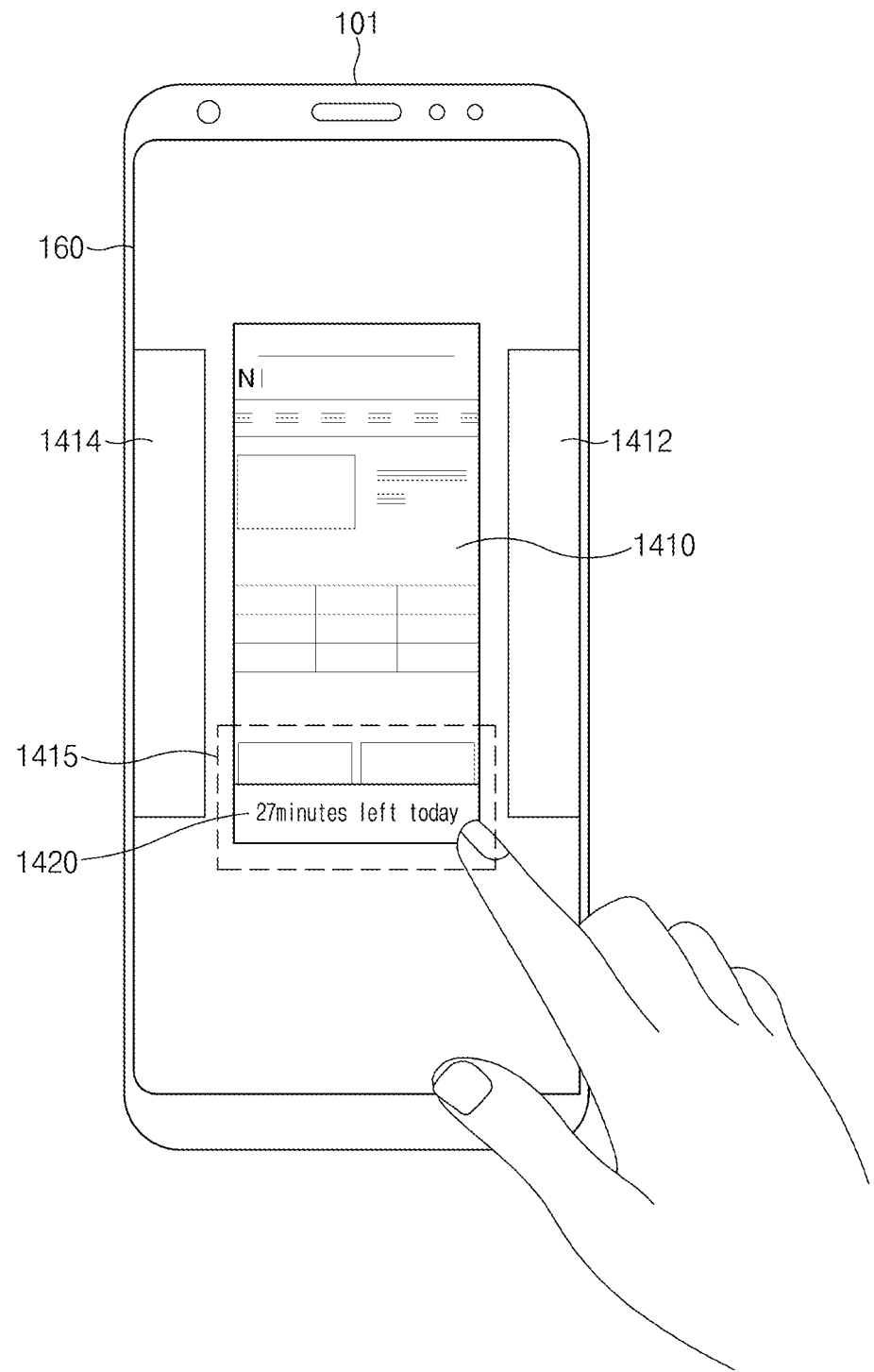
FIG. 14 is a diagram illustrating an example operation of displaying a plurality of background images according to various embodiments.
Figure 15:
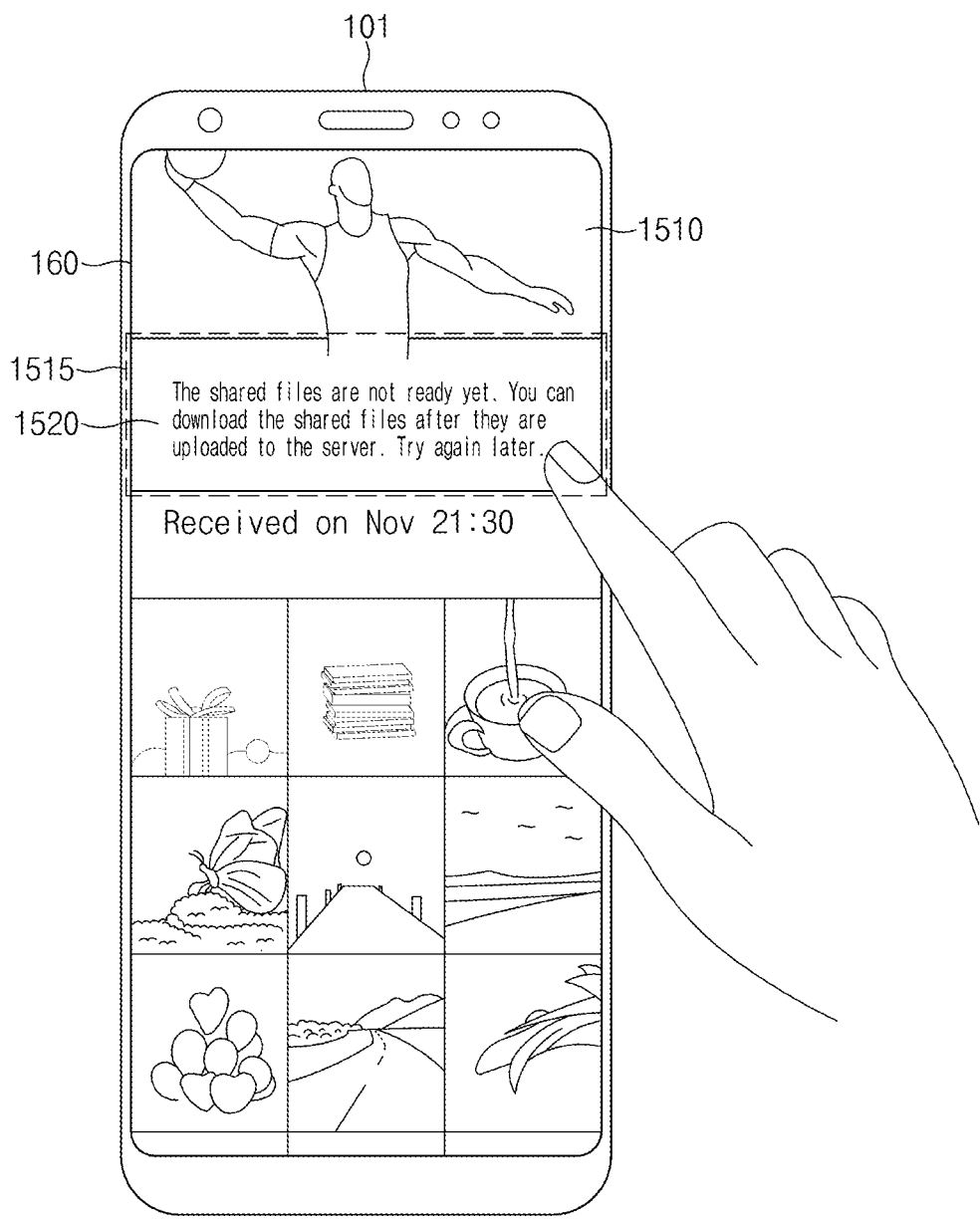
FIG. 15 is a diagram illustrating an example operation of displaying a background image in an image sharing function according to various embodiments.

FIGS. 13, 14 and 15 are diagrams illustrating an example operation of displaying a background image according to various embodiments. FIG. 13 is a diagram illustrating an example operation of displaying a background image in an edge region according to various embodiments, FIG. 14 is a diagram illustrating an example operation of displaying a plurality of background images according to various embodiments, and FIG. 15 is a diagram illustrating an example operation of displaying a background image in an image sharing function according to various embodiments.

According to an embodiment, the electronic device 101 may display the background image on at least a partial region as well as an entire region of the display module 160. For example, referring to FIG. 13, the electronic device 101 may display a background image 1310 in an edge region 1305 of the display module 160. When an event (e.g., receiving the user input) related to the display of the content is sensed, the electronic device 101 may display a content 1320 (e.g., a copy button or a paste button) on the background image 1310. According to an embodiment, to secure both visibility of the content 1320 and visibility of the background image 1310, the electronic device 101 may apply the graphic effect (e.g., the blur effect) to a region 1315 surrounding the content 1320. In this case, the electronic device 101 may apply the gradient graphic effect to the region 1315 surrounding the content 1320 based on a distance from the content 1320.

According to an embodiment, the electronic device 101 may output a plurality of windows via the display module 160 in response to the user input. For example, referring to FIG. 14, the electronic device 101 may display a first window 1410, a second window 1412, and a third window 1414. For example, the first window 1410 displayed at a center of the display module 160 may refer, for example, to a window for an application running in a foreground, and the second window 1412 and the third window 1414 displayed at both sides of the display module 160 may respectively refer, for example, to windows for applications running in a background. The first window 1410, the second window 1412, and the third window 1414 may respectively contain the background images. For example, when the first window 1410 is a window for a web browser, the first window 1410 may contain a web page as the background image. When the event (e.g., the notification event) related to the display of the content is sensed, the electronic device 101 may display a content 1420 (e.g., a pop-up window indicating notification) on the background image of the first window 1410. According to an embodiment, to secure both visibility of the content 1420 and visibility of the background image of the first window 1410, the electronic device 101 may apply the graphic effect (e.g., the blur) to a region 1415 adjacent to the content 1420. In this case, the electronic device 101 may apply the gradient graphic effect to the region 1415 adjacent to the content 1420 based on a distance from the content 1420.

According to an embodiment, the electronic device 101 may render an image to be shared as the background image. For example, referring to FIG. 15, the electronic device 101 may receive a user input for sharing an image 1510. When the sharing of the image 1510 is not successful, the electronic device 101 may display text 1520 indicating that the sharing of the image 1510 has failed on a partial region of the image 1510. To secure both visibility of the image 1510 and visibility of the text 1520, the electronic device 101 may apply the gradient graphic effect to a partial region 1515 of the image 1510 surrounding the text 1520. For example, the graphic effect may be an effect in which the blur effect and the dim effect are combined with each other.

As described above, an electronic device (e.g., 101 in FIG. 1) according to various example embodiments may include: a display (e.g., at least the portion of the display module 160 in FIG. 1), a processor (e.g., 120 in FIG. 1) operatively connected to the display, and a memory (e.g., 130 in FIG. 1) operatively connected to the processor, and the memory may include instructions that, when executed, cause the processor to: sense an event related to display of content, apply a gradient graphic effect to at least a partial region (e.g., 220 and 230 in FIG. 2) of a background image (e.g., 210 in FIG. 2) based on a distance from a first region (e.g., 220 in FIG. 2) where the content is displayed, and display the gradient graphic effect-applied background image and the content via the display.

According to an example embodiment, the instructions, when executed, may cause the processor to: render the content, render the background image, render the background image in which the gradient graphic effect is applied to at least the partial region, render a window containing the gradient graphic effect-applied background image and the content, and display the rendered window via the display.

According to an example embodiment, the instructions, when executed, may cause the processor to: obtain geometry information of the content, obtain at least one parameter for applying the gradient graphic effect based on the obtained geometry information, and render the background image in which the gradient graphic effect is applied to at least the partial region based on the geometry information and the at least one parameter.

According to an example embodiment, the at least one parameter may include offset values of a plurality of pixels of at least the partial region, and the instructions, when executed, may cause the processor to: determine the offset values respectively for the plurality of pixels based on distances between the plurality of pixels and the first region, and apply the gradient graphic effect to at least the partial region by calculating color values of the plurality of pixels based on the determined offset values.

According to an example embodiment, the instructions, when executed, may cause the processor to: calculate a color value for a first pixel among the plurality of pixels based on a first offset value, and calculate a color value of a second pixel by applying a second offset value greater than the first offset value to the second pixel closer to the first region than the first pixel among the plurality of pixels.

According to an example embodiment, the at least one parameter may include level of detail (LOD) values of a plurality of pixels of at least the partial region, and the instructions, when executed, may cause the processor to: determine the LOD values respectively for the plurality of pixels based on distances between the plurality of pixels and the first region, and apply the gradient graphic effect to at least the partial region by applying the determined LOD values respectively to the plurality of pixels.

According to an example embodiment, the instructions, when executed, may cause the processor to: apply a first LOD value to a first pixel among the plurality of pixels, and apply a second LOD value greater than the first LOD value to a second pixel among the plurality of pixels closer to the first region than the first pixel.

According to an example embodiment, the instructions, when executed, may cause the processor to: generate a plurality of images having a plurality of resolutions for at least the partial region of the background image, and apply the gradient graphic effect to at least the partial region by applying each image among the plurality of generated images corresponding to each of the determined LOD values to each of the plurality of pixels.

According to an example embodiment, the graphic effect may include at least one of a blur effect, a depth of field (DoF) effect, a dim effect, and a blend effect.

According to an example embodiment, the instructions, when executed, may cause the processor to: display, via the display, the background image in an entire region of the display, in a partial region of the display, or together with other background images.

As described above, a method of an electronic device (e.g., 101 in FIG. 1) according to various example embodiments may include: sensing an event related to display of content, applying a gradient graphic effect to at least a partial region (e.g., 220 and 230 in FIG. 2) of a background image (e.g., 210 in FIG. 2) based on a distance from a first region (e.g., 220 in FIG. 2) where the content is displayed, and displaying the gradient graphic effect-applied background image and the content.

According to an example embodiment, the method may include: sensing the event related to the display of the content, applying the gradient graphic effect to at least the partial region of the background image based on the distance from the first region where the content is displayed, and displaying the gradient graphic effect-applied background image and the content.

According to an example embodiment, the applying of the gradient graphic effect may include: rendering the content, rendering the background image, and rendering the background image in which the gradient graphic effect is applied to at least the partial region, and the displaying of the gradient graphic effect-applied background image and the content may include rendering a window containing the gradient graphic effect-applied background image and the content, and displaying the rendered window.

According to an example embodiment, the applying of the gradient graphic effect may include: obtaining geometry information of the content, obtaining at least one parameter for applying the gradient graphic effect based on the obtained geometry information, and rendering the background image in which the gradient graphic effect is applied to at least the partial region based on the geometry information and the at least one parameter.

According to an example embodiment, the at least one parameter may include: offset values of a plurality of pixels of at least the partial region, and the applying of the gradient graphic effect may include: determining the offset values respectively for the plurality of pixels based on distances between the plurality of pixels and the first region, and calculating color values of the plurality of pixels based on the determined offset values.

According to an example embodiment, the calculating of the color values of the plurality of pixels may include: calculating a color value for a first pixel among the plurality of pixels based on a first offset value, and calculating a color value of a second pixel by applying a second offset value greater than the first offset value to the second pixel closer to the first region than the first pixel among the plurality of pixels.

According to an example embodiment, the at least one parameter may include level of detail (LOD) values of a plurality of pixels of at least the partial region, and the applying of the gradient graphic effect may include: determining the LOD values respectively for the plurality of pixels based on distances between the plurality of pixels and the first region, and applying the gradient graphic effect to at least the partial region by applying the determined LOD values respectively to the plurality of pixels.

According to an example embodiment, the applying of the determined LOD values respectively to the plurality of pixels may include: applying a first LOD value to a first pixel among the plurality of pixels, and applying a second LOD value higher than the first LOD value to a second pixel among the plurality of pixels closer to the first region than the first pixel.

According to an example embodiment, the applying of the gradient graphic effect may include: generating a plurality of images having a plurality of resolutions for at least the partial region of the background image, and applying the gradient graphic effect to at least the partial region by applying each image among the plurality of generated images corresponding to each of the determined LOD values to each of the plurality of pixels.

According to an example embodiment, the graphic effect may include: at least one of a blur effect, a depth of field (DoF) effect, a dim effect, and a blend effect.

According to an example embodiment, the displaying of the gradient graphic effect-applied background image and the content may include: displaying the background image in an entire region of a display of the electronic device, in a partial region of the display, or together with other background images.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display;
a processor, comprising processing circuitry, operatively connected to the display; and
memory operatively connected to the processor, wherein the memory includes instructions that, when executed by the processor, cause the electronic device to:
sense an event related to display of content;
determine level of detail (LOD) values respectively for a plurality of pixels based on distances between the plurality of pixels and a first region where the content is displayed;
generate a plurality of images from a background image, the plurality of images having a plurality of resolutions corresponding to the LOD values;
apply a gradient graphic effect to at least a partial region of a background image based on the distance from a first region by applying the LOD values to the plurality of images; and
display the gradient graphic effect-applied background image and the content via the display.

2. The electronic device of claim 1, wherein the instructions, when executed, cause the electronic device to:
render the content;
render the background image;
render the background image in which the gradient graphic effect is applied to at least the partial region;
render a window containing the gradient graphic effect-applied background image and the content; and
display the rendered window via the display.

3. The electronic device of claim 1, wherein the instructions, when executed, cause the electronic device to:
obtain geometry information of the content;
obtain at least one parameter for applying the gradient graphic effect based on the obtained geometry information; and
render the background image in which the gradient graphic effect is applied to at least the partial region based on the geometry information and the at least one parameter.

4. The electronic device of claim 3, wherein the at least one parameter includes offset values of a plurality of pixels of at least the partial region,
wherein the instructions, when executed, cause the electronic device to:
determine the offset values respectively for the plurality of pixels based on distances between the plurality of pixels and the first region; and
apply the gradient graphic effect to at least the partial region by calculating color values of the plurality of pixels based on the determined offset values.

5. The electronic device of claim 4, wherein the instructions, when executed, cause the electronic device to:
calculate a color value for a first pixel among the plurality of pixels based on a first offset value; and
calculate a color value of a second pixel by applying a second offset value greater than the first offset value to the second pixel closer to the first region than the first pixel among the plurality of pixels.

6. The electronic device of claim 3, wherein the at least one parameter includes the LOD values.

7. The electronic device of claim 6, wherein the instructions, when executed, cause the electronic device to:
apply a first LOD value to a first pixel among the plurality of pixels; and
apply a second LOD value greater than the first LOD value to a second pixel among the plurality of pixels closer to the first region than the first pixel.

8. The electronic device of claim 1, wherein the graphic effect includes at least one of a blur effect, a depth of field (DoF) effect, a dim effect, and a blend effect.

9. The electronic device of claim 1, wherein the instructions, when executed, cause the electronic device to display, via the display, the background image in an entire region of the display, in a partial region of the display, or together with other background images.

10. A method of operating an electronic device, the method comprising:
sensing an event related to display of content;
applying a gradient graphic effect to at least a partial region of a background image based on a distance from a first region where the content is displayed; and
displaying the gradient graphic effect-applied background image and the content,
wherein the applying the gradient graphic effect comprises:
determining level of detail (LOD) values respectively for a plurality of pixels based on distances between the plurality of pixels and a first region; and
generating a plurality of images from a background image, the plurality of images having a plurality of resolutions corresponding to the LOD values.

11. The method of claim 10, wherein the applying of the gradient graphic effect includes:
determining offset values respectively for the plurality of pixels based on distances between the plurality of pixels of at least the partial region and the first region; and
calculating color values of the plurality of pixels based on the determined offset values.

12. The method of claim 11, wherein the calculating of the color values of the plurality of pixels includes:
calculating a color value for a first pixel among the plurality of pixels based on a first offset value; and
calculating a color value of a second pixel by applying a second offset value greater than the first offset value to the second pixel closer to the first region than the first pixel among the plurality of pixels.

13. The method of claim 10, wherein the applying of the gradient graphic effect further includes:
applying the determined LOD values respectively to the plurality of pixels,
wherein the applying of the determined LOD values respectively to the plurality of pixels includes:
applying a first LOD value to a first pixel among the plurality of pixels; and
applying a second LOD value greater than the first LOD value to a second pixel among the plurality of pixels closer to the first region than the first pixel.

14. The method of claim 10, wherein the applying of the gradient graphic effect includes:
rendering the content;
rendering the background image; and
rendering the background image in which the gradient graphic effect is applied to at least the partial region, and
the displaying of the gradient graphic effect-applied background image and the content includes:
rendering a window containing the gradient graphic effect-applied background image and the content; and
displaying the rendered window.

15. The method of claim 10, wherein the applying of the gradient graphic effect includes:
obtaining geometry information of the content;
obtaining at least one parameter for applying the gradient graphic effect based on the obtained geometry information; and
rendering the background image in which the gradient graphic effect is applied to at least the partial region based on the geometry information and the at least one parameter.

16. The method of claim 10, wherein the graphic effect includes at least one of a blur effect, a depth of field (DoF) effect, a dim effect, or a blend effect.

17. The method of claim 10, wherein the displaying of the gradient graphic effect-applied background image and the content includes displaying the background image in an entire region of a display of the electronic device, in a partial region of the display, or together with other background images.

* * * * *